Oct. 5, 1926.
E. L. DELANY
1,602,374
MIXING VALVE
Filed Feb. 26, 1925
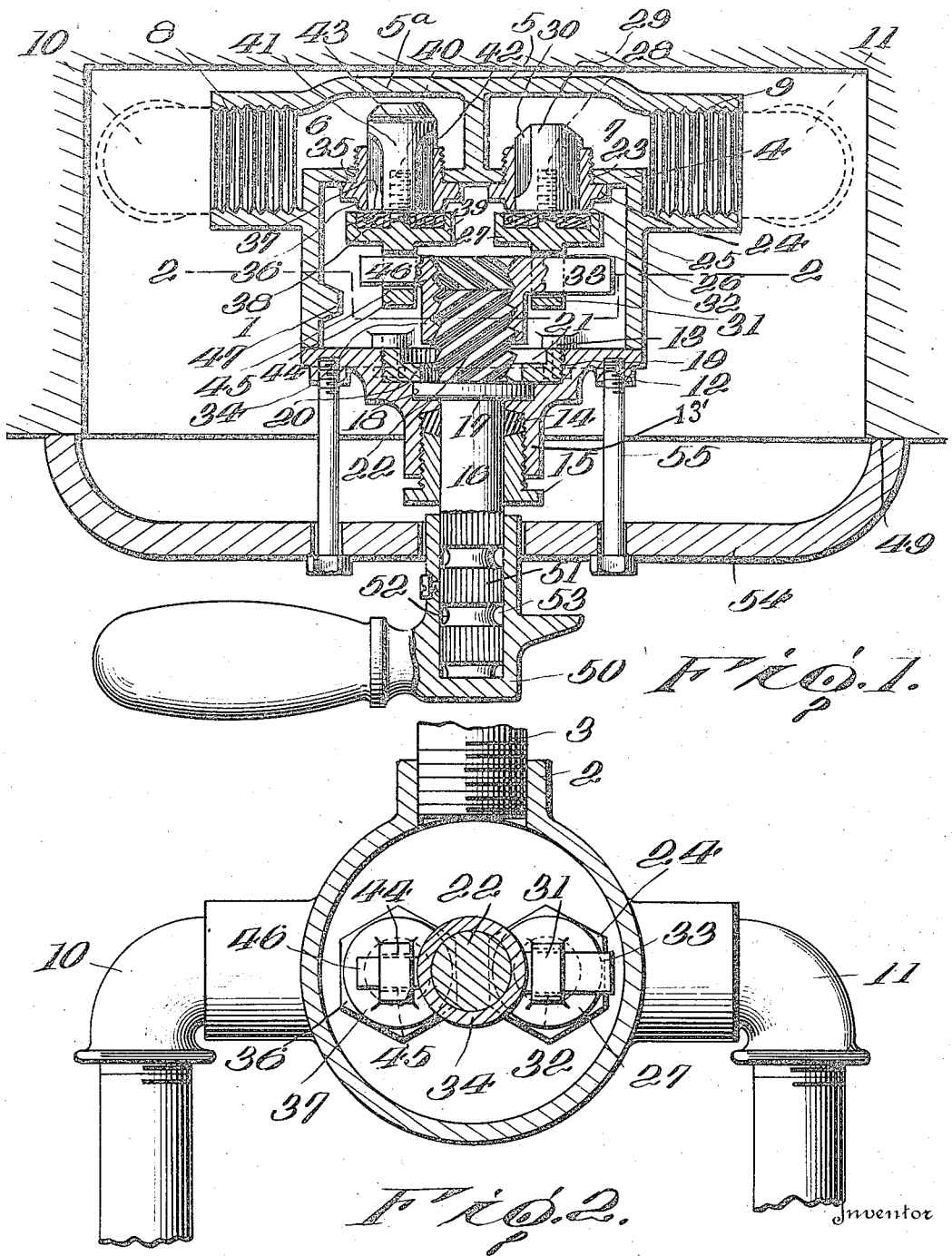
Inventor
E. L. Delany.
By C. R. Wright, Jr.
Attorney Patented Oct. 5, 1926.

1,602,374

UNITED STATES PATENT OFFICE.

EDWARD L. DELANY, OF BROOKLYN, NEW YORK.

MIXING VALVE.

Application filed February 26, 1925. Serial No. 11,821.

My invention relates to improvements in mixing valves.

The object of my invention is to provide a mixing valve particularly adapted for bath purposes, whereby either cold, warm or hot water can be drawn from a single spigot operated by a single lever, and at the same time provide a valve whereby it is impossible to turn on scalding water upon the first part of the movement of the operating lever.

Another object of my invention is to provide a valve of this character adapted more particularly for shower baths in which the valves are arranged within a recess in the wall, above the tub, and providing means whereby the opening is closed, and to also provide means whereby any slight variation in the distance the valve is set from the outer face of the wall can be compensated for, and said closing plate serving as a dial, having the proper marking thereon to indicate when the valve is open or closed, and also having points marked thereon indicating cold, warm and hot water.

A further object of my invention is to provide a valve of this character in which it is impossible for the plumber to assemble the valves in the casing so that the cold water valve will be transposed opposite the hot water inlet, and thus prevent the liability of scalding by supplying hot water to the valve when cold water is indicated by the valve operating lever on the dial.

A still further object of my invention is to provide a valve of this character in which both the hot and cold water valves, the discharge pipe and the hot and cold water inlet pipes are so connected to the casing that a smaller casing can be used, also eliminating all screws and hand finishing and fitting of the valve, the same being finished by machine, thus reducing the cost of manufacture, and at the same time provide a simple, cheap and effective mixing valve having certain details of structure and combination of parts hereinafter more fully set forth.

In the accompanying drawings:—

Figure 1 is a horizontal sectional view of my improved mixing valve showng it in position in the recess of the wall.

Figure 2 is a vertical sectional view taken on the line 2—2 of Figure 1.

Referring now to the drawings, 1 represents the housing, which as shown in Figure 2 of the drawings, is of a cylindrical form, having at its upper end a screw threaded nipple 2 into which is threaded the discharge pipe 3. This cylindrical housing has the end 4 provided with two openings through which the cold and hot water passes thereto, as hereinafter more fully described. The rear wall 4 of the housing 1 is provided with an enlarged divided housing 5 and 5ª forming the cold water passage 6, and the hot water passage 7, each of these passages have its outer end internally screw threaded as indicated at 8 and 9, for receiving the upper ends of the hot and cold water pipes 10 and 11, which are embedded in the wall. The forward end of the casing is closed by the cover 12, held thereon by means of screws 13, as shown in Figure 1 of the drawings. This cover is provided at its center with a stuffing box 13', having a packing 14 therein, adapted to be expanded by the nut 15 against the valve operating shaft 16, all of which is well understood and needs no further description. The valve operating shaft 16 is provided with an integral annular flange 17 resting in a recess 18 in the inner face of the cover 12 below the stuffing box, and the cover beyond this recess 18 is provided with an annular screw threaded recess 19, into which is screwed the externally threaded nut 20, which is adapted to bear against the flange 17 and hold the shaft 16 against longitudinal movement, but to allow the free rotaton thereof. This externally threaded nut 20 is provided with a rectangular opening 21 to receive a correspondingly shaped wrench, whereby the same can be screwed into position and removed when desired.

The valve operating shaft beyond the annular flange 17 is provided with the threaded portion 22, the pitch of the threads being great, so that upon the rotation of the shaft 16 the valve operating member mounted thereon, will travel a considerable distance during the oscillation of said shaft 16, as will be presently described. The rear wall 4 of the housing 1 is provided with an opening 23 which is screw threaded and into which is screwed the valve seat 24. This valve seat 24 has the raised seat 25, adapted to engage the washer 26, carried by the hot water valve 27. The valve 27 has a screw threaded extension 28 which passes through the washer 26, and has screwed thereon the plug 29 which closely fits the walls of the valve seat 24, and is provided on its outer face with cut away portions 30, forming passages to allow the passage of water. The outer end of the valve 27 is provided with an extension 31 having a transverse opening 32 therein, and through which the trunnion 33 loosely passes. This trunnion 33 is carried by a cylindrical member 34, screw threaded upon the threaded portion 22 of the valve operating shaft 16. The rear wall 4 of the housing is provided with an opening 35 which communicates with the space 6, at the rear of the housing. This opening 35 is internally threaded to receive the threaded portion of the valve seat 36 and the valve seat has a raised portion 37 adapted to engage the washer 38, carried by the cold water valve 39. This valve 39 has a screw threaded extension 40 passing through the washer 38, and upon which is screwed the plug 41. This plug 41 has the passages 42 arranged around its periphery and has a solid portion 43 at its outer end, all of which will be hereinafter more fully described. The valve 39 is provided with an extension 44 which is provided with the opening 45 through which the trunnion 46 passes, the trunnion being carried by the cylindrical member 34 screwed on the threaded portion 22 of the shaft 16, on the opposite side from the trunnion 33.

From the drawings it will be seen that the trunnion 46 is smaller and shorter than the trunnion 33 and thus the hot and cold water valves can not be interchanged so that hot water would be first supplied to the housing. This point is very essential, as plumbers often assemble these mixing valves so that hot water is first supplied to the housing, and a person is often scalded, but by this structure it will be seen that the hot water valve can not be interchanged with the cold water valve. To absolutely insure this positioning of the valve, in the housing, the housing 1 is provided with a lug 47 upon its inner face, in a line with the valve seats, and the round projection 33 carrying the valve 28, being longer than the trunnion 46, carrying the valve 37, the trunnion 33 would engage lug 47 and thus the valves could not be inserted in any position except that shown in Figure 1 of the drawings.

In assembling valves of this character it often happens that the plumber has placed the hot and cold water pipes 10 and 11 at different distances from the outer face 49 of the wall, and therefore provision has to be made so that the operating lever 50 can be placed on the shaft 16 at different points. In order to provide for this, the shaft 16 is provided with elongated serrations 51, and said serrated portions are separated by a series of annular grooves 52. The operating lever is provided with a recess 53 having serrations corresponding with the serrations 51 on the shaft 16 and whereby the operating lever is more securely locked on the shaft. By having the annular grooves 52 it will be seen that the shaft 16 can be sawed off at a point through the annular grooves, and thus the serrations will not be interrupted so that the operating lever 50 can be readily forced upon the serrated portion of the shaft. The cover plate 54 is held to the housing 1 by means of bolts 55, this can be readily clamped in position. The cover plate 54 has the proper marking thereon to indicate when the valve shaft is in position to supply cold, warm or hot water, or when the water is cut off.

By this structure it will be seen that the plumber, when assembling the valves, can not place the cold water valve on the trunnion 33, as the same is of a diameter greater than the opening 45 in the extension of the cold water valve 37. The valves being assembled as shown, they can not be placed in the housing 1 with the hot water valve in the cold water valve opening, as the trunnion 33 is extended outwardly and would engage the lug 47 carried by the housing and thus the parts can not be assembled or any other position than that shown in Figure 1 of the drawings.

In operation the valves are in the position shown in Figure 1 of the drawings, and by turning the handle 5, the threads 22 carried by the shaft 16 will cause the member 34 to travel outwardly, carrying with it, by means of the arms 36 and 43, the two valves. Any slight movement of the shaft 16 unseats the washer 38 and allows the cold water to pass through the passage 32 into the space surrounding the two valves, and outwardly through the discharge pipe. A continued movement of the operating lever 50 causes the hot water valve 29 to be moved out so that the passages 30, are brought into a position so that their upper ends are beyond the valve seat 25, and both cold and hot water is entering the space surrounding the valve and mixing therein, and warm water is being discharged through the pipe 3. A continued movement of the lever 50 moves the valves outwardly until the solid portion 43 of the cold water valve 37 is brought outwardly beyond the valve seat and cold water is cut off, and at the same time moving the hot water valve 29 further outwardly so that a greater supply of hot water passes through the passages 30 in the plug 29 of the hot water valve.

Having thus fully described my invention what I claim is:—

1. A mixing valve comprising a housing having hot and cold water inlets, communicating with an outlet, valves controlling the supply of water from the hot and cold water inlets to the outlet, an operating means adapted to operate the valve so that the cold water is first discharged from the outlet, and a continued movement of the lever allows warm water to pass from the outlet and then hot water, and a connection between the operating lever and the valves, whereby the valves can not be interchanged.

2. A mixing valve comprising a housing having hot and cold water inlets communicating with an outlet, valves controlling the supply of water from the hot and cold water inlets to the outlet, an operating means having a loose connection with the valves and so constructed that they can not be interchanged, and said valves constructed and arranged to first admit cold water, then cold and hot water and hot water.

3. A mixing valve comprising a housing having hot and cold water inlets, valves controlling the supply of water from the hot and cold water inlets, and an outlet, an operating means for the valves and having a loose connection with the valves of different sizes, whereby the valves can not be interchanged, and said valves constructed to first admit cold, then hot and cold water and then hot water, upon the movement of the operating lever.

4. A mixing valve comprising a housing having hot and cold water inlets, an outlet intermediate the hot and cold water inlets, and communicating therewith, valves controlling the passages from the hot and cold water inlets to the outlet, an operating means having loose connections of different dimensions with the valves, whereby they can not be interchanged, and said valves constructed and arranged upon the movement of the operating lever to first admit cold water, second cold and hot water and to cut off the cold water and admit hot water.

5. A mixing valve comprising a housing having hot and cold water inlets, an outlet intermediate the hot and cold water inlets, and comunicating therewith, valves controlling the passages from the hot and cold water inlets to the outlet, a single operating means having laterally extending trunnions of different sizes passing through openings in the hot and cold water valves of corresponding sizes, and means whereby the hot and cold water valves can not be transposed.

6. A mixing valve comprising a housing, hot and cold water inlets, communicating with an outlet, valves controlling the communication between the hot and cold water inlets and the outlet, a threaded member carried by the housing intermediate the valves, a cylindrical member carried by the threaded member, and lateral trunnions of different sizes and lengths passing through openings in extensions carried by the cold and hot water valves of corresponding sizes, and a projection carried by the housing whereby the hot and cold water valves can not be transposed.

7. A mixing valve comprising a housing having hot and cold water inlets communicating with an outlet, valves controlling the communication between the hot and cold water inlets and the outlet, a movable member having two oppositely arranged lateral trunnions of different sizes and lengths adapted to pass through openings of corresponding sizes in the valve, and a lug carried by the housing whereby the hot and cold water valves can not be transposed.

8. A mixing valve comprising a housing having hot and cold water inlets, communicating with an outlet, valves controlling the communication between the hot and cold water inlets and the outlet, a movable member having two oppositely arranged trunnions of different sizes adapted to pass into openings in the valves of corresponding sizes, and means for operating said movable member.

9. A mixing valve comprising a housing having hot and cold water inlets, communicating with an outlet, valves of different construction controlling the hot and cold water inlets, a movable member having lateral trunnions on opposite sides of different sizes, adapted to pass through openings of corresponding sizes in the valves, and means for operating said movable means whereby cold water is first discharged from the outlet, and a continued movement of the member allows warm water and then hot water to pass from the outlet.

10. A mixing valve comprising a housing having hot and cold water inlets communicating with an outlet, valves of different constructions controlling the communication between the hot and cold water inlets and the outlet, a movable member carried by the housing intermediate the valves, outwardly extending trunnions carried by the movable member and of different sizes and lengths, and adapted to pass through correspondingly size openings in the valves, and a lug carried by the inner face of the housing whereby the longer trunnion will engage the lug to prevent the valves from being placed therein in a transposed position.

11. A mixing valve comprising a housing having hot and cold water inlets, in communication with an outlet, valves of different lengths and construction controlling the communication between the hot and cold water inlets and the outlet, a movable member carried by the housing intermediate the valves, a lever moving said member outwardly and inwardly, two oppositely arranged outwardly extending trunnions of different sizes and lengths carried by the movable members and passing through openings in the valves of corresponding sizes, a lug carried by the inner walls of the housing adapted to prevent the valves from being transposed by engagement of the longer trunnion with the lug.

12. A mixing valve comprising a housing having hot and cold water inlets, communicating with an outlet, valves controlling the communication between the hot and cold water inlets and the outlet, a valve operating shaft, an adjustable cover plate and dial carried by the housing, the outer end of the operating shaft having an elongated serrated portion interrupted by an annular recess whereby the same can be sawed off, and an operating lever having a recess having corresponding serrations whereby the lever is locked on the shaft.

13. A mixing valve comprising a housing, valves in said housing, a single operating means for said valves, a cover plate adjustably carried by the housing, an operating shaft extending through the cover plate and having an elongated serrated portion interrupted by annular grooves, whereby a portion can be cut off, an operating handle having a recess provided with corresponding serrations adapted to receive said serrated portion of the shaft.

14. A mixing valve comprising a housing having hot and cold water inlets communicating with an outlet, valves controlling the supply of water from the hot and cold water inlets to the outlet, an operating means for the valves so constructed that the valves can not be interchanged.

15. A mixing valve comprising a housing having hot and cold water inlets, and an outlet, valves controlling the supply of water from the hot and cold inlets to the outlet, an operating means for the valves, and having a connection therewith so constructed that the valves can not be interchanged.

16. A mixing valve comprising a housing having hot and cold water inlets communicating with an outlet, valves controlling the supply of water from the hot and cold water inlets to the outlet, and an operating means having connections with the valves of different dimensions, whereby the valves can not be interchanged.

17. A mixing valve comprising a housing having hot and cold water inlets communicating with an outlet, valves controlling the supply of water from the hot and cold water inlets to the outlet, and an operating means having connections with the valves of different diameters and lengths, whereby the valves can not be interchanged.

In testimony whereof, I have signed this specification.

EDWARD L. DELANY.